United States Patent [19]
Fairchild

[11] Patent Number: 4,688,879
[45] Date of Patent: Aug. 25, 1987

[54] HOLOGRAPHIC MULTI-COMBINER FOR HEAD-UP DISPLAY

[75] Inventor: Ronald C. Fairchild, Ann Arbor, Mich.

[73] Assignee: Kaiser Optical Systems, Inc., Ann Arbor, Mich.

[21] Appl. No.: 752,734

[22] Filed: Jul. 8, 1985

[51] Int. Cl.⁴ .................. G02B 5/32; G02B 27/10
[52] U.S. Cl. .................... 350/3.7; 350/174
[58] Field of Search .............. 350/3.7, 172, 174

[56] References Cited

U.S. PATENT DOCUMENTS

| | | | |
|---|---|---|---|
| 4,099,841 | 7/1978 | Ellis | 350/174 |
| 4,225,215 | 9/1980 | Cojan | 350/174 |
| 4,647,142 | 3/1987 | Boot | 350/174 |

*Primary Examiner*—Bruce Y. Arnold
*Attorney, Agent, or Firm*—Krass & Young

[57] ABSTRACT

A head-up display which combines an internal image, produced by a cathode ray tube image source, at substantially a wavelength of light $\lambda$, with an external image, using a holographic optical element. The holographic optical element consists of two or more holographic optical subelements in series, each satisfying the Bragg condition with respect to wavefronts at the wavelength $\lambda$ from a particular direction. While wavefronts satisfying these conditions are reflected to the observer's field of view, all others are transmitted through the holographic subelements. The holographic optical subelements largely overlap in the direction of their illumination by the internal image source, and may slightly overlap in the direction their images are to be presented to the observer. Wavelength $\lambda$ is chosen at the peak of the phosphor response curve of the cathode ray tube image source.

8 Claims, 9 Drawing Figures

HOLOGRAPHIC MULTI-COMBINER FOR HEAD-UP DISPLAY

FIELD OF THE INVENTION

The present invention relates generally to head-up displays and more particularly to head-up display apparatus employing two reflective holographic optical elements as a combiner to provide a large vertical field of view.

DESCRIPTION OF THE PRIOR ART

Head-up display (HUDs) are used in aircraft cockpits to provide the pilot with a display of information such as instrument readings, heading and aiming symbology and the like, superimposed on his view through the cockpit window. The displayed information is collimated by the optics of the HUD to provide the pilot with an image that appears to be focused at infinity. This allows the pilot to view both the outside world and displayed information without refocusing his eyes.

HUDs achieve the superposition of the display information with the pilot's view of the outside world by use of a combiner which is supported in the cockpit in the pilot's normal field of view. One form of a combiner is a partially "silvered" mirror which allows the pilot to view the outside world through the combiner and the cockpit window. The display information is projected onto the combiner at an angle so that a portion of the light is reflected to the pilot's eye.

Alternatively, a reflective holographic optical element (HOE) may be employed as a combiner. The HOE is designed by a reflect light of the particular wavelength emitted by a cathode ray tube (CRT) phosphor, or other image source, and to transmit all other light wavelengths. Such HOEs take advantage of a phenomenon known as the Bragg condition which relates the wavelength and angle (with respect to the holographic fringes) of the light which will be reflected. Light not satisfying the Bragg condition is transmitted through the HOE. When properly designed, such HOEs achieve a higher optical efficiency than partially "silvered" mirrors. They reflect a high percentage of the light emitted by the image source without substantially attenuating the light passing through the windshield from outside.

The combiner may be planar, or it may be curved to provide the combiner with optical power. With optical power, the combiner can collimate the image source light and focus the image of the entrance pupil of the combiner at the pilot's eyes to improve the field of view. In contrast, when a planar combiner is used the vertical field of view of the pilot is limited by a combination of optical and geometric considerations. For a fixed size collimator, there is a limit to the increase in the instantaneous vertical field of view that can be obtained by enlarging the combiner because light rays reflected by the combiner which do not reach the pilot's eyes are effectively lost to the system.

One way to increase the vertical field of view is to use a pair of parallel planar reflectors arranged so that the light wavefronts that pass through the lower reflector, closer to the display, are passed to the upper reflector and then reflected to the pilot's eyes. This arrangement was successfully demonstrated using partially "silvered" reflectors. An effort has also been made to use this dual combiner concept with HOE combiners to achieve the efficiency advantages of the HOEs with the increased vertical field of view of the dual combiner element.

In the partially "silvered" mirror version of the dual combiner the transmissivity of the partially "silvered" mirror is utilized to allow light from the display to pass through the lower combiner onto the upper combiner. Because the HOEs have a much higher reflection efficiency for a narrow range of wavelengths, the initial design for HOE combiners provided that the upper and lower combiner subelements would reflect separate wavelength bands within the emission spectrum of the image source. In that way, the wavelengths to be reflected by the upper combiner would first pass through the lower combiner relatively unattenuated.

One problem with this holographic approach is created by the fact that the image source typically has a peaked emissions spectrum. By making each of the combiner subelements reflect only a portion of that spectrum, displaced from the peak, some loss in optical efficiency results. Another limitation of this approach is that the image source spectral bandwidth must be substantially broader than the spectral bandwidth of the combiner subelements.

SUMMARY OF THE INVENTION

The present invention is accordingly directed toward a head-up display employing a combiner made from multiple holographic combiner subelements. This combiner provides the observer with brighter images of uniform color and greater vertical extent than were known in the prior art. This is acomplished by employing a design in which the combiner subelements reflect a band of light wavelengths at the center of the display information source emission spectrum to the pilot's eye. The light reflected off the upper most subelement passes through the lower sublements virtually unattenuated because of Bragg angle considerations.

Broadly, each of the combiner subelements is designed to reflect this band of maximum intensity wavelengths to the pilot's eye. The geometry of the combiner, the display information source, and the pilot's headbox is arranged so that the lower subelements will not reflect those rays forming the image which must be reflected by the upper subelements to the pilot's eyes. This occurs because the angles at which those rays reach the lower subelements is outside the range of angles of Bragg reflectivity for each of the lower subelements.

The present invention thus provides a HUD having a large vertical field of view and a high optical efficiency in terms of both the pilot's view of the outside world through the combiner and the combiner's reflection of the light from the image source.

The holographic optical subelements can be planar and mutually parallel. A mirror can be used to reflect the light from the image source to the combiner, and this reflected light can be collimated by a lens before reaching the combiner. Alternatively, the combiner can be used to collimate the image seen by the pilot.

Other objectives, advantages, and applications of the present invention will be made apparent by the following description of the preferred embodiment of the invention.

Detailed Description of the Preferred Embodiment

In the following detailed description of the preferred embodiment, since the holographic optical elements of the preferred embodiment are reflection holograms, the terms "reflection" and "diffraction" are used interchangeably to refer to the phenomenon of the incident wavefront being redirected by the hologram to the vicinity of the pilot's eyes. Therefore, the term "reflection" shall be used in a general way to refer to redirection of the wavefront, which, depending on the properties of the holographic optical element, may not coincide with the direction of classical reflection. For the special case of a hologram with the interference fringes parallel to the surface of the hologram, the directions of all diffracted orders coincide with the direction of classical reflection.

Figure 1:
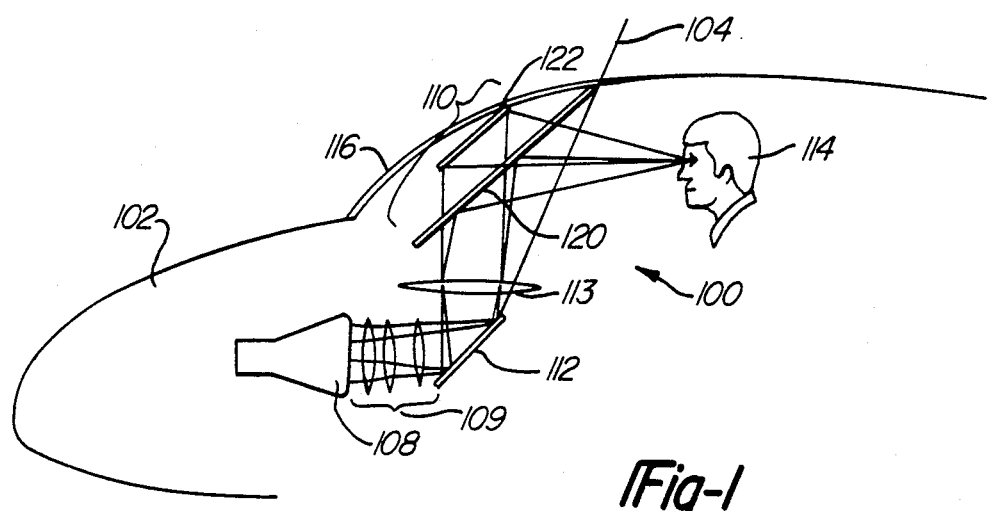
FIG. 1 is a schematic side elevation view of a head-up display representing a preferred embodiment of the invention.

Referring now to the drawings, and more particularly to FIG. 1, there is shown a schematic representation of a head-up display 100, contained in an airplane fuselage 102. The HUD 100 generally is composed of a cathode ray tube image source 108, a lens 109 and a collimator lens 113 which projects an image to the holographic optical element 110 preferably after the image produced by the image source 108 has been reflected by a mirror 112.

The HOE 110 then presents an image of the display information to the pilot 114 in the aircraft. The image reflected by the HOE 110 is superposed upon the view provided to the pilot 114 through the windshield 116, presenting the pilot with a view of the outside world as well as symbologies desired in aircraft operation. The collimated image reflected by the HOE 110 appears to the pilot to be focused at infinity. This desirable feature means that the pilot 114 need not change the focus of his eyes to see the outside world or the superposed image reflected by the HOE 110 of the head-up display 100.

As further shown in FIG. 1, the HOE 110 is composed of at least two subelements 120 and 122. Portions of these subelements are "volume" holograms, made from dichromated gelatin, which offer the advantages of very high optical efficiency, ease of processing, and high transmissivity. (See, T.A. Shankoff, "Phase Holograms in Dichromated Gelatin," Journal of Applied Optics, vol. 7, No. 10, October 1968 and B. J. Chang and C. D. Leonard, "Dichromated Gelatin for the Fabrication of Holographic Optical Elements," Journal of Applied Optics, vol. 18, No. 14, July, 15 1979.) These subelements reflect the wavefront provided by the cathode ray tube image source 108, transmitted by the lens 109, reflected by the mirror 112, and collimated by lens 113 to provide an image to the pilot 114.

The holographic portions of the two subelements 120 and 122 are mostly overlapped with respect to the wavefront exiting collimation lens 113. The holographic portions of the two subelements 120 and 122 are also slightly overlapped with respect to the normal position of the pilot's eyes. In the overlapped regions of the two holograms, each being a strip approximately 15 millimeters wide starting at the edge of the holographic portion of each subcombiner, the optical efficiency is monotonically reduced from its normally high value to zero at the edge. This arrangement creates an apparently continuous HOE as seen by the pilot 114.

Figure 3:
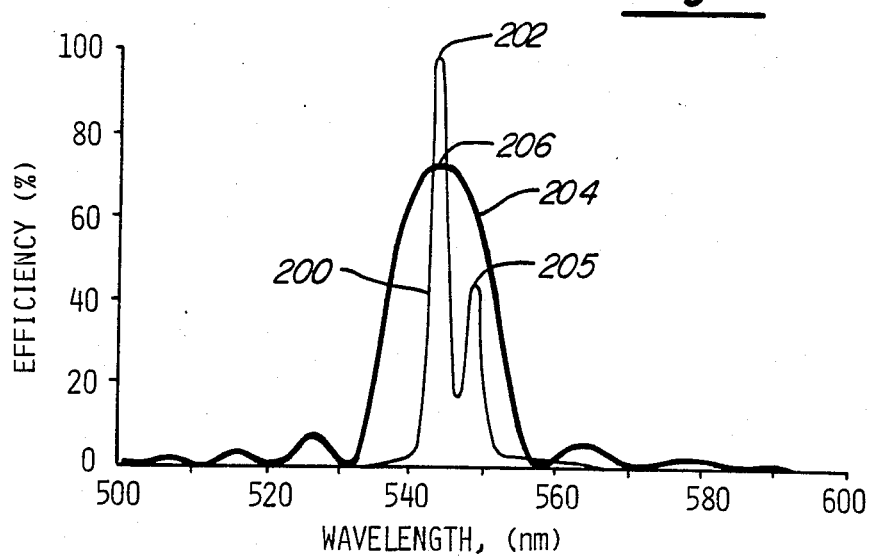
FIG. 3 is a pilot of typical curves relating a portion of the phosphor response curve of FIG. 2 and the response of a holographic optical element.
Figure 2:
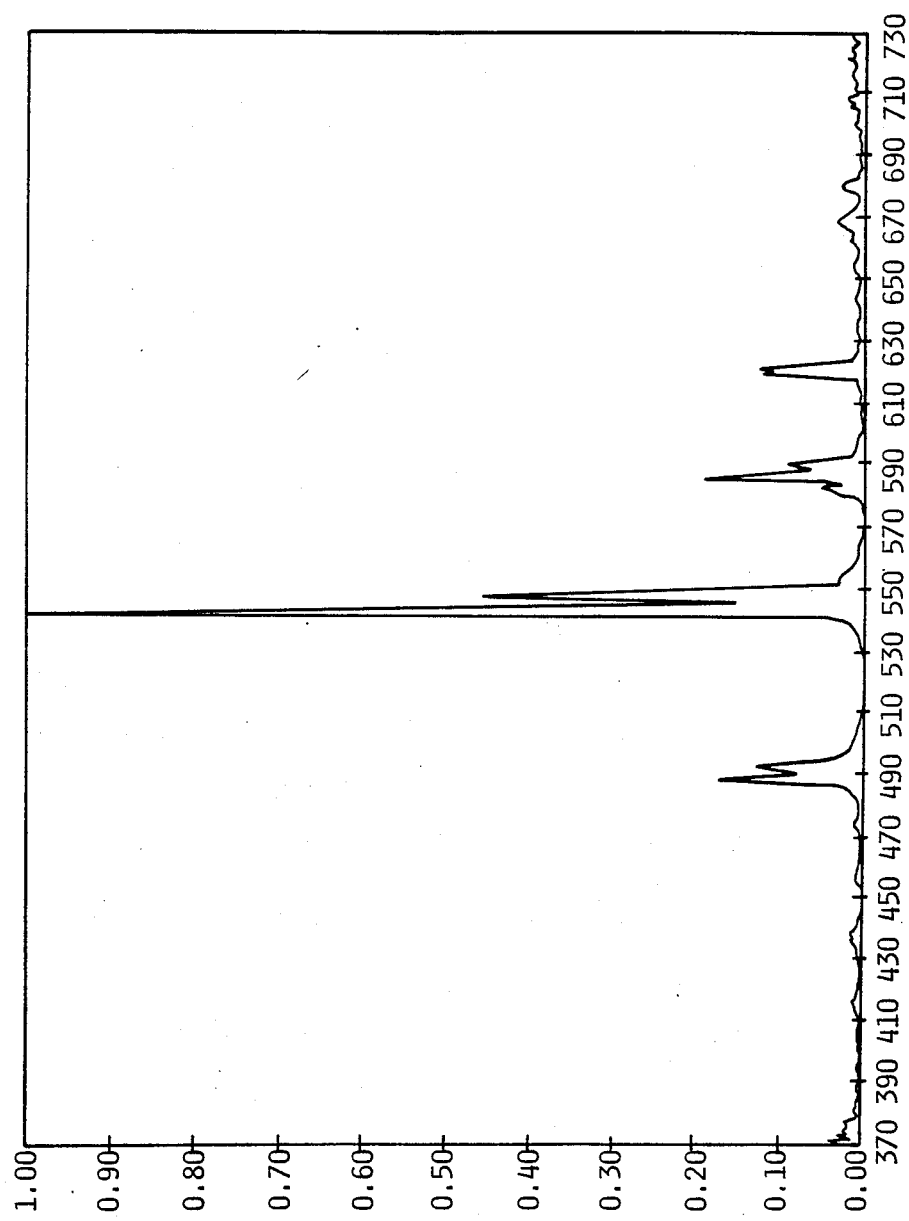
FIG. 2 is a graph illustrating a typical response curve for a phosphor used in a cathode ray tube image source for the HUD of FIG. 1.

Now referring to FIG. 2 which shows a typical light emission response for a phosphor of the type used in a cathode ray tube image source 108, it is clear that the phosphor response is not a single, discrete wavelength. A phosphor response typically consists of a series of peaks, each including a small interval of wavelengths. The interval about one such set of peaks is shown in FIG. 3 of the drawings. The phosphor response curve 200 has a main peak 202 and a subsidiary peak 205 and decreases outside of these two peaks. Curve 204 shows a typical spectral response of a holographic optical element for light directed from one direction. The spectral response of the holographic optical element is much wider than the phosphor response curve.

The present invention employs holographic optical subelements 120 and 122 (shown in FIG. 1), each having a response 204. Response 204 has a peak at 206, located at approximately the same wavelength as the main peak 202 of the phosphor response curve 200. This subelement response 206 provides an image, brighter than that shown by the prior art, at one band of wavelengths throughout the full angular extent of the display.

Figure 4:
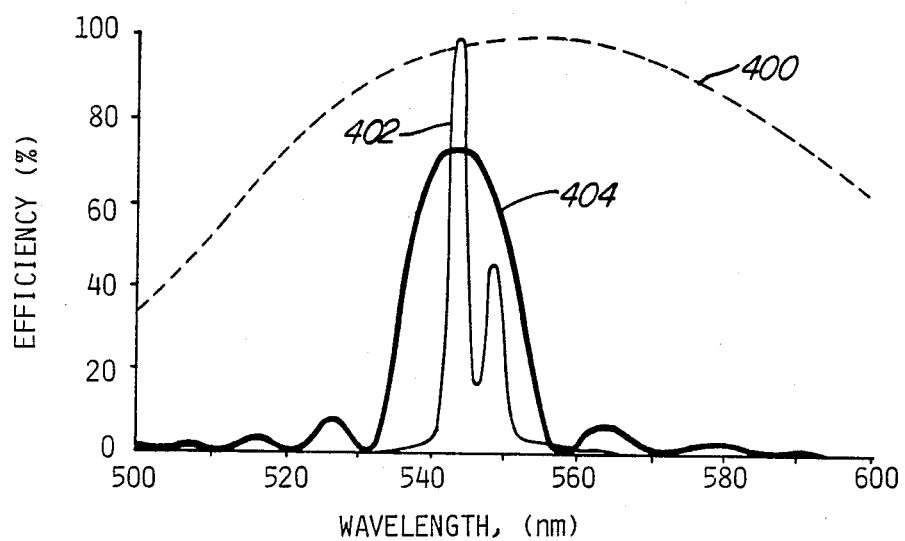
FIG. 4 is a plot of typical curves relating to the brightness of the image perceived by the pilot as a function of wavelength, for a given direction of illumination of the lower combiner subelement.

Now referring to FIG. 4 which is a graph of variables relating to the reflection of images from the lower combiner subelement as a function of wavelength, curve 400 shows the photopic eye response curve. This curve shows that the human eye is most responsive to a wavelength of approximately 555 nm. Curve 402 illustrates a respresentative phosphor response, showing a response which has a peak at approximately 544 nm. Curve 404 shows, for a given position of the pilot's head and a proper impingement angle on the lower combiner subelement, the range of wavelengths reflected by the lower combiner subelement. The subelement is constructed to place the peak of curve 404 at approximately the same wavelength as the peak of the phosphor response curve 402.

Figure 5:
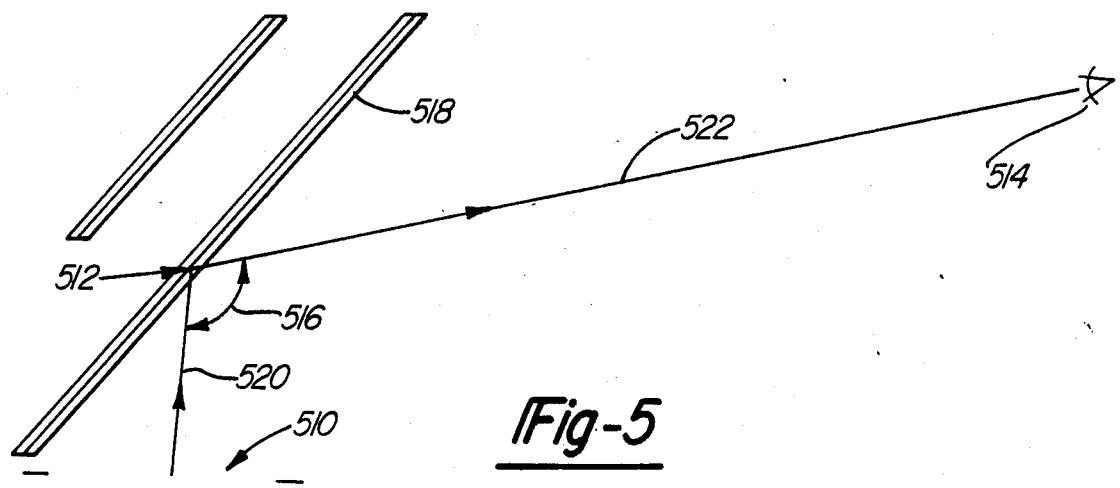
FIG. 5 is a cross sectional view of the HUD of the present invention illustrating reflection from the lower combiner subelement.

FIG. 5 shows a ray trace curve for diffractions by the lower combiner subelement 518. All light rays impinging upon either the upper or lower combiner subelements first pass through the opening 510. This opening 510 is defined by the combined optics through which the image from the image source 108 (in FIG. 1) passes before reaching the combiner subelements. Images which should appear to arise from the lower portion of the pilot's field of view are diffracted by the lower combiner subelement.

Point 512 in FIG. 5 is chosen to illustrate this diffraction. Light ray 520 impinges on lower combiner subelement 518, resulting in light ray 522. The spacing and orientation of the holographic fringe planes which lead to peak Bragg diffractions can be defined. These factors depend upon the geometric configuration of the HUD, the expected position of the pilot's eyes and the wavelength of the light rays inside the hologram medium.

Figure 8:
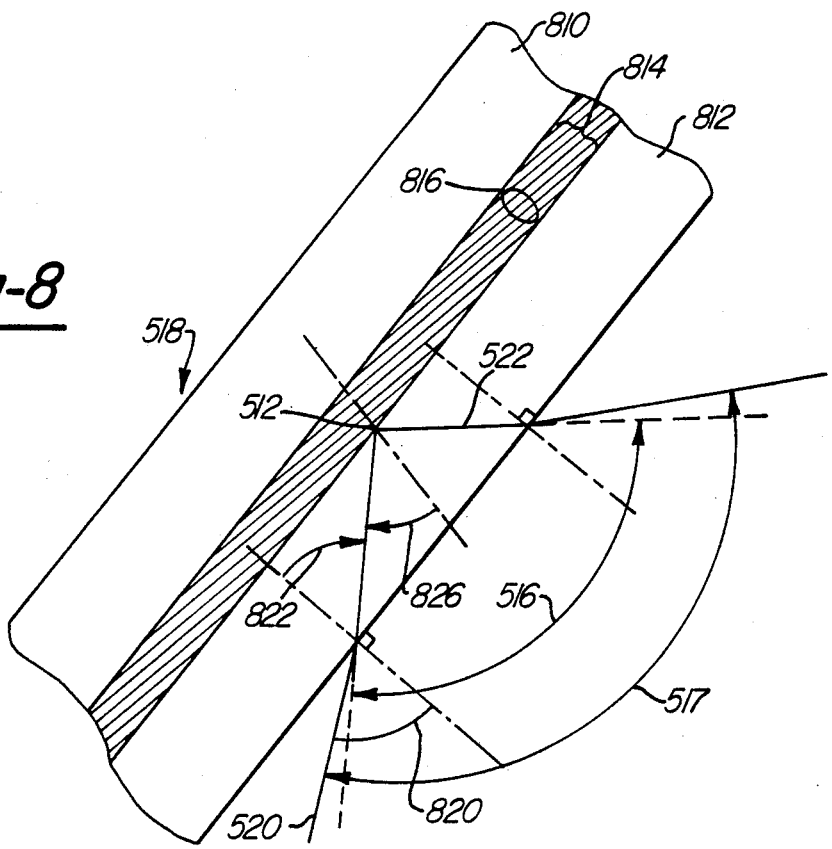
FIGS. 8 and 9 are close-up cross sectional views of the lower combiner subelement of the HUD of the present invention.

The external angle 517 is greater than the internal angle 516 as shown in FIG. 8, a close-up view of the lower combiner near point 512. This is because of a refraction of the light ray 520 which occurs at the surface of the lower combiner, both before and after the light energy is reflected by the holographic fringes.

Referring still to FIG. 8 of the drawings, lower combiner subelement 518 is shown to be composed of two transparent layers 810 and 812, made of glass or the like, between which is sandwiched a layer 814 made of a recording medium such as a photographic emulsion or the like, in which are contained holographic fringes 816.

Light ray 520 impinges on lower combiner subelement layer 812, where it is refracted. Input incident angle 820 ($\theta_{in}^a$), as measured from a normal to the air-glass interface surface, and output angle 822 ($\theta_{out}^g$) are related by Snell's law:

$$n_g \sin (\theta_{out}^g) = n_a \sin (\theta_{in}^a)$$

where the n's are indices of refraction, and g and a are sub- and superscripts representing glass and air, respectively. Since $n_g$ is greater than $n_a$, then $\theta_{out}^g$ is less than $\theta_{in}^a$ as shown in FIG. 8.

After the light ray 520 has been refracted at the air-glass interface, it travels in a straight line until it impinges on holographic layer 814. In a similar manner to that outlined above, the light ray will be refracted at the interface between the transparent layer 812 and the holographic layer 814. In practice, the ray deviation caused by this refraction is generally small because the difference in refractive index between the layers is usually only a few percent. At the holographic layer 814 the light ray 520 is diffracted through the angle 516. To satisfy the Bragg condition, the relationship $$\lambda_O = 2 n_e d \cos (\theta/2)$$

must hold, where $\theta$ is the angle 516, the fringes 816 are spaced by a distance d, $n_e$ is the index of refraction in the holographic layer 814, and $\lambda_O$ is the free-space wavelength of the light which is diffracted by the fringes 816.

The diffracted ray 522 undergoes refraction at the interfaces between the holographic layer 814 and the transparent layer 812 and air. The diffracted ray 522 then travels in a straight line to the pilot's eyes 514.

Although holographic optical elements applying the Bragg diffraction phenomenon are intended to apply to only a specific wavelength λ and a specific reflection condition (given by the angle $\theta$), these HOEs diffract to a lesser extent other wavelengths near λ. This fact results in the HOE reflecting a range of wavelengths. This phenomenon is illustrated in the lower combiner reflection curve 404 in FIG. 4. The light energy which is not reflected at point 512 as described by reflection curve 404 is transmitted through the lower combiner subelement, a factor which will be discussed in the following.

Figure 6:
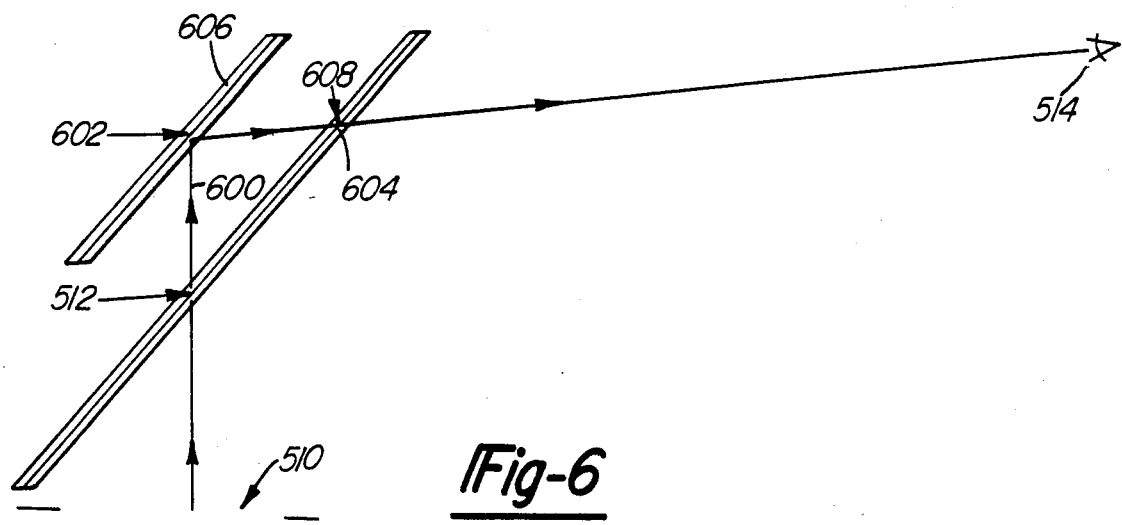
FIG. 6 is a cross sectional view of the HUD of the present invention illustrating reflection from the upper combiner subelement.

Referring now to FIG. 6, a description of reflection from the upper combiner subelement may be given. As in the discussion for reflections from the lower combiner subelement, illustrated by FIG. 5, all light energy reaching the upper combiner subelement first passes through opening 510. Limiting the discussion to the light energy striking point 512, light energy which is not diffracted in accordance with the Bragg condition, as discussed above, is transmitted through the lower combiner subelement 518 to the upper combiner subelement 606.

Figure 9:
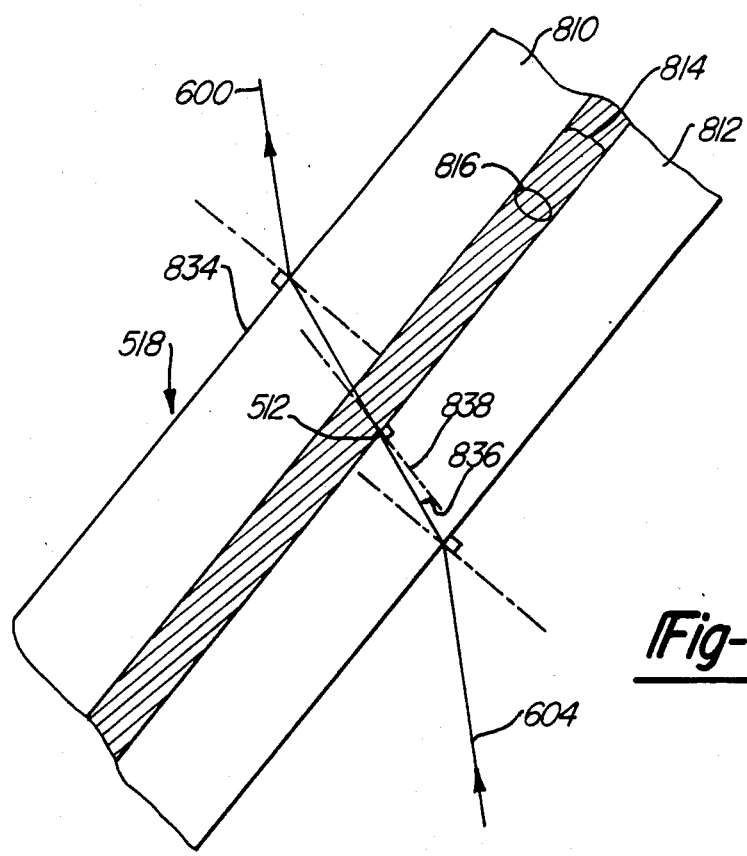

As shown in FIG. 9, light ray 604, which is refracted in accordance with Snell's Law above, is not diffracted by the fringe planes 816 in layer 814. The light ray is not diffracted because its incident angle 836 is outside the range of angles which satisfy the Bragg condition. Although it is refracted slightly upon passing through layer 814, the light ray follows parallel paths (shown to be colinear in FIG. 8 and 9); on both sides of layer 814. Refraction at the glass-air interface of the upper surface 834 of the lower combiner subelement 518 causes emerging light ray 600 to follow a direction parallel to that of ray 604.

FIG. 6 illustrates light ray 600, having the appropriate wavelength λ, which has passed through the lower combiner subelement because it does not comply with the Bragg condition. Light ray 600 does not comply with the Bragg condition because it strikes the lower combiner subelement at an angle different from that at which reflection is intended. Therefore after a slight deviation in its path caused by refraction by the lower combiner material (a minor factor which will be ignored in the ensuing discussion), light energy from ray 600 continues upward until it strikes the upper combiner subelement at point 602.

Following diffraction at point 602 light energy then strikes at point 608 on the lower combiner subelement, is transmitted through the lower combiner subelement, and then continues to the pilot's eye 514. Unless point 608 falls within the overlap region, from which light is reflected to the pilot's eyes 514 by both upper and lower subelements, the transmission at point 608 is nearly 100% of the light diffracted by the upper combiner subelement because the lower combiner subelement contains no holographic fringes in this area. In the overlap region, transmission of light diffracted by the upper combiner subelement through the holographic portion of the lower combiner subelement may be less than 100%, but this deficiency is compensated by the light diffracted from the lower combiner subelement at point 608.

Figure 7:
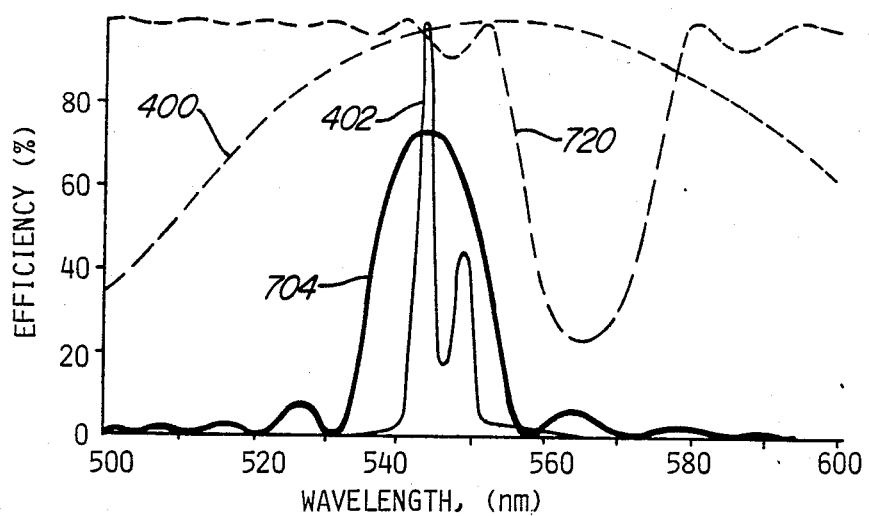
FIG. 7 is a plot of typical curves relating to the brightness of the image perceived by the pilot as a function of wavelength, for a given direction of illumination of the upper combiner subelement.

FIG. 7 describes the diffraction of the light energy striking the upper combiner subelement from a given direction. The photopic eye response curve 400 and the phosphor emission response curve 402 are repeated from FIG. 4. The response of the upper holographic subelement to wavelengths in the region of interest is shown by curve 704. Curve 720 illustrates, for light impinging on the upper combiner subelement at the given angle, that the wavelengths having a low transmission factor are longer than the wavelengths which this HOE is designed to direct toward the pilot. This is because, as illustrated in FIG. 9, the angle 836 at which refracted light ray 604 strikes the holographic fringes in the lower combiner subelement is smaller with respect to the normal 838 to these fringes than angle 826 in FIG.

8, the corresponding angle for ray 520 which is designed to be diffracted by the lower combiner. Therefore the cosine of angle 836 is increased, and the wavelength diffracted (and therefore not transmitted) is also increased in compliance with the equation $$\lambda_O = 2n_e d \cos(\theta/2)$$

Thus, the transmission characteristics of the lower combiner subelement will not prevent the light at the intended wavelength λ from reaching the upper combiner subelement.

As in the design of the lower combiner subelement, the upper combiner subelement is recorded to allow Bragg diffraction to occur at the intended wavelength and the expected angles of incidence.

The upper and lower holographic optical subelements both provide images containing the wavelength λ to the pilot, who sees an image of greater vertical extent.

The absorption of light energy can be minimized by properly choosing the holographic materials used. Materials that provide highly efficient Bragg diffraction and have low absorption qualities are good candidates for this role. One such material well known to those skilled in the art is dichromated gelatin which is more fully described in the references given earlier. Other suitable recording materials may be used.

It is apparent that various changes may be made in form, construction and arrangements of the parts of the preferred embodiment without departing from the spirit and scope of the invention or sacrificing all of its material advantages, the form hereinbefore described being merely a preferred or exemplary embodiment thereof.

I claim:

1. A head-up display supported in an aircraft cockpit having a windshield, including a display information source having a light output at a predetermined wavelength and a combiner supported in the pilot's field of view through the cockpit windshield, the combiner being operative to reflect the source output to the pilot and consisting of a plurality of HOE combiner subelements each constructed to reflect the predetermined wavelength, supported relative to the source and the pilot so that a portion of the light reaching one of the subelements from the source intersects the subelement at substantially the Bragg angle and is reflected to the pilot's eye and another portion of the light reaching said one subelement intersects the subelement at an angle substantially different from the Bragg angle and is transmitted through said subelement and at least part of such transmitted light intersects another of the subelements at substantially the Bragg angle and is reflected from such other subelement to the pilot's eye, whereby the pilot perceives an image of the source formed by light reflected from more than one subelement.

2. The head-up display of claim 1, wherein said combiner subelements are planar.

3. The head-up display of claim 1, wherein the display information source is a cathode ray tube.

4. A head-up display supported in an aircraft cockpit having a windshield, including a display information source having a light output at a predetermined wavelength, lens means for collimating the light from the source, and a combiner supported in the pilot's field of view through the cockpit windshield, the combiner being operative to reflect the collimated source output to the pilot and consisting of a plurality of HOE combiner subelements each constructed to reflect the predetermined wavelength, supported relative to the lens means and the pilot so that a portion of the light reaching one of the subelements from the lens means intersects the subelement at substantially the Bragg angle and is reflected to the pilot's eye and another portion of the light reaching said one subelement intersects the subelement at an angle substantially different from the Bragg angle and is transmitted through said subelement and at least part of such transmitted light intersects another of the subelements at substantially the Bragg angle and is reflected from such other subelement to the pilot's eye, whereby the pilot perceives an image of the source formed by light reflected from more than one subelement.

5. The head-up display of claim 4, wherein said combiner subelements are planar.

6. The head-up display of claim 5, wherein said combiner subelements are mutually parallel.

7. The head-up display of claim 4, wherein the display information source is a cathode ray tube.

8. A head-up display supported in an aircraft cockpit having a windshield, including a display information source having a light output at a predetermined wavelength, reflecting means for reflecting the light output, lens means for collimating ther reflected light, and a combiner supported in the pilot's field of view through the cockpit windshield, the combiner being operative to reflect the collimated light to the pilot and consisting of two parallel planar HOE combiner subelements each constructed to reflect the predetermined wavelength, supported relative to the lens means and the pilot so that a portion of the light reaching the subelement closer to the lens means intersects the subelement at substantially the Bragg angle and is reflected to the pilot's eye and another portion of the light reaching the subelement closer to the lens means intersects the subelement at an angle substantially different from the Bragg angle and is transmitted through said subelement and at least part of such transmitted light intersects the other subelement at substantially the Bragg angle and is reflected from such other subelement to the pilot's eye, whereby the pilot perceives an image of the source formed by light reflected from two subelements.

* * * * *